[19]
United States Patent
Hirano et al.

(10) Patent No.: US 7,312,941 B2
(45) Date of Patent: *Dec. 25, 2007

(54) DISK DRIVE WITH HEAD-DISK INTERACTION SENSOR INTEGRATED WITH SUSPENSION

(75) Inventors: Toshiki Hirano, San Jose, CA (US); Ullal Vasant Nayak, San Jose, CA (US); Qinghua Zeng, San Jose, CA (US)

(73) Assignee: Hitachi Global Storage Technologies Netherlands B.V., Amstetdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 10/664,296

(22) Filed: Sep. 17, 2003

(65) Prior Publication Data

US 2005/0057834 A1    Mar. 17, 2005

(51) Int. Cl.
*G11B 27/36* (2006.01)
*G11B 19/04* (2006.01)

(52) U.S. Cl. .......................... 360/31; 360/60

(58) Field of Classification Search .. 360/245.2–245.7, 360/244, 240, 39, 55, 31, 244.1, 294.7, 237.1
See application file for complete search history.

(56) References Cited

U.S. PATENT DOCUMENTS 4,532,802 A      8/1985   Yeack-Scranton et al.
5,777,815 A  *   7/1998   Kasiraj et al. ................ 360/75
5,929,326 A  *   7/1999   Imaino et al. ............... 360/104
6,046,871 A      4/2000   Schaenzer et al.
6,181,520 B1 *   1/2001   Fukuda ..................... 360/244.1

FOREIGN PATENT DOCUMENTS

JP          07-141804      *   2/1995

OTHER PUBLICATIONS

Budde, Richard A., "Transducer Gimbal Structure", Apr. 1995, U.S. Statutory Invention Registration No. H1424.*
"Optimal Means for Generating a Write Inhibit in Hard Disk Drives in Response to External Shock Using Accelerometers", Oct. 1996, IBM Technical Disclosure Bulletin, Volume No. 39, Issue No. 10, pp. 131-132.*

* cited by examiner

*Primary Examiner*—Andrea Wellington
*Assistant Examiner*—Varsha A. Kapadia (57) ABSTRACT

A Hard Disk Drive (HDD) includes a write-inhibit signal that is generated by a head-disk interaction sensor during a write process that is integrated with a suspension of the HDD when fly-height modulation of the slider is detected during a write process. The suspension load beam includes a dimple and a laminated flexure. The laminated flexure includes a surface that is adapted to receive a slider and a surface that is adapted to contact the dimple. The head-disk interaction sensor is fabricated as part of the laminations of the flexure. The head-disk interaction sensor can be an accelerometer that senses an acceleration of the flexure when the slider contacts the disk of the disk drive and/or a pressure sensor that senses a pressure between the flexure and the dimple when the slider contacts the disk. A write-inhibit circuit is responsive to the sensor signal by inhibiting the write process.

21 Claims, 6 Drawing Sheets

View A

View B
FIG. 3C

DISK DRIVE WITH HEAD-DISK INTERACTION SENSOR INTEGRATED WITH SUSPENSION

CROSS-REFERENCE TO RELATED APPLICATION

The present application is related, co-assigned and concurrently filed patent application Ser. No. 10/664,295 entitled "Head-Disk Interaction Sensor Integrated With Suspension," which is incorporated by reference herein.

BACKGROUND OF THE INVENTION

1. Field of the Invention

The present invention relates to disk drives. More particularly, the present invention relates to a sensor system for improving write operations for a hard disk drive (HDD).

2. Description of the Related Art

Figure 1:
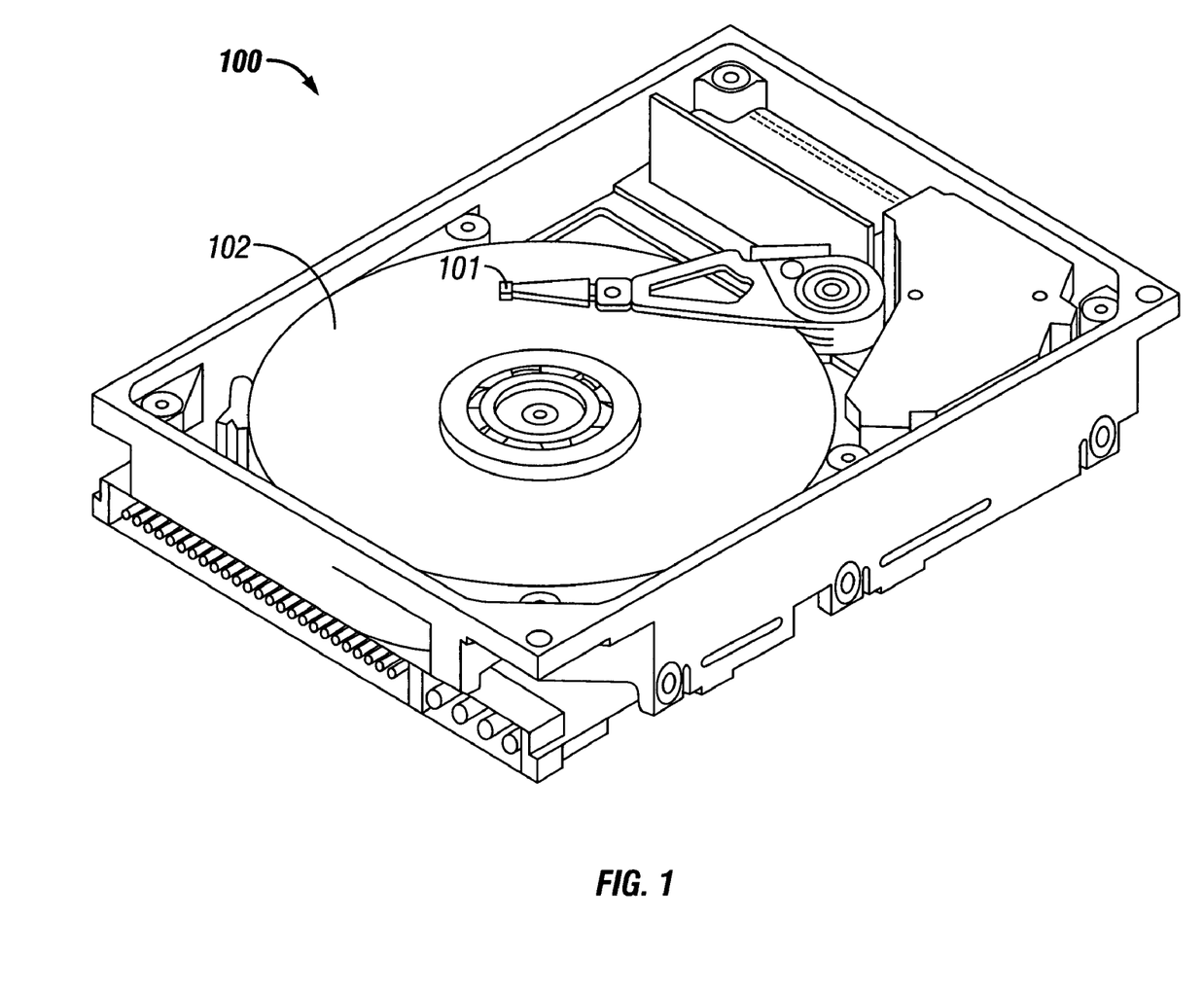
FIG. 1 shows an exemplary disk drive having a magnetic read/write head.

FIG. 1 shows an exemplary hard disk drive (HDD) 100 having a magnetic read/write (R/W) head (or a recording slider) 101 that includes, for example, a tunnel-valve read sensor, that is positioned over a selected track on a magnetic disk 102. As the fly-height of slider 101 becomes smaller, the chance of slider 101 hitting asperities on disk 102, for example, disk defects, particles, and/or lubricant bumps, becomes greater, resulting in a higher probability of fly-height modulation, i.e., "slider jump-up". When fly-height modulation occurs during a write process, that portion of data being written during slider jump-up can be lost because the data is not properly written on the disk due to greater than expected write-head-to-disk distance. There is no current technique available for detecting fly-height modulation during a write process. Consequently, write processes are performed essentially "blind" with the hope that the data is properly written on the disk.

Conventional approaches for minimizing slider modulation include minimization of head-disk interaction by, for example, reducing the take-off height of a disk, reducing the number of particles, and using less mobile lubricant on the disk. These approaches, however, will reach their respective limits for minimizing head-disk interaction as slider fly-height is further reduced.

Consequently, what is needed is a technique for detecting slider fly-height modulation during a write process. Further, what is needed is a technique for inhibiting a write operation when slider fly-height modulation is detected.

BRIEF SUMMARY OF THE INVENTION

The present invention provides a technique for detecting slider fly-height modulation during a write process. Additionally, the present invention provides a technique for inhibiting a write operation when slider fly-height modulation is detected.

The advantages of the present invention are provided by a suspension for a disk drive having a suspension load beam having a dimple and a laminated flexure. The laminated flexure is coupled to the suspension load beam and has a surface that is adapted to receive a slider and a surface that is adapted to contact the dimple. According to the invention, the flexure includes a head-disk interaction sensor that outputs a sensor signal when the slider contacts a disk of the disk drive. One embodiment of the head-disk interaction sensor is an accelerometer that senses an acceleration of the flexure that is generated by the slider contacting the disk of the disk drive. The accelerometer includes a piezoelectric material layer and a conductive material layer that are each formed as a layer of the laminated flexure and are each patterned to substantially correspond to a top surface of a back portion of the slider.

An alternative or an additional embodiment of the head-disk interaction sensor is a pressure sensor that senses a pressure between the flexure and the dimple that is generated by the slider contacting the disk of the disk drive. One configuration of the pressure sensor includes a piezoelectric material layer and a conductive material layer that are each formed as a layer of the laminated flexure and each are patterned to substantially correspond to a surface region of the flexure corresponding to the dimple. One pattern is substantially a square shape. An alternative pattern is a substantially circular shape. The piezoelectric material layer generates a voltage between a top portion and a bottom portion of the piezoelectric material layer when the slider contacts the disk of the disk drive that corresponds to a magnitude of a force with which the slider contacts the disk of the disk drive.

An alternative configuration of the accelerometer includes a piezoelectric material layer and a conductive material layer that are each formed as a layer of the laminated flexure and are each patterned to form a first region and a second region. The first and second regions respectively correspond to a front portion and a back portion of the slider and respectively corresponding to first and second surface regions of the surface of the flexure adapted to contact the dimple. The first region of the piezoelectric material layer generates a first voltage between a top portion and a bottom portion of the first region of the piezoelectric material layer when the slider contacts the disk of the disk drive. Similarly, the second region of the piezoelectric material layer generates a second voltage between a top portion and a bottom portion of the second region of the piezoelectric material layer when the slider contacts the disk of the disk drive. The first and second voltages respectively generated between the top portions and the bottom portions of the first and second regions of the piezoelectric material layer each correspond to a magnitude of a force with which the slider contacts the disk of the disk drive. A pitch mode of the slider can be determined based on a difference between the first voltage and the second voltage. Additionally, a first bending mode of a body of the slider body can be determined based on a sum of the first and second voltages.

The suspension of the present invention further includes a write-inhibit circuit that is responsive to the sensor signal by inhibiting a write operation of the disk drive. The write-inhibit circuit includes a filter circuit that condition the sensor signal. One embodiment of the filter circuit is a low-pass filter having a passband that is greater than about 20 kHz. Another embodiment of the filter circuit is a high-pass filter having a passband that is less than about 2 MHz. Yet another embodiment of the filter circuit is a bandpass filter having a passband between about 20 kHz and about 2 MHz. Further, the filter circuit can be a bandpass filter having a passband corresponding to about a pitch frequency of the slider. For example, the filter circuit can have a narrow passband at about 200 kHz. Further still, the filter circuit can be a bandpass filter having a passband corresponding to about a bending mode frequency of a body of the slider. For example, the filter circuit can have a narrow passband at about 1.6 MHz. Alternatively, the filter circuit can be a passband filter having a passband that includes about 200 kHz and about 1.6 MHz.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention detects head-disk interaction in an HDD by using at least one sensor that is integrated with suspension. Slider motion caused by Head-Disk Interference (HDI) is detected by using a force (or pressure) sensor for monitoring the force (or pressure) between the back of the slider and the suspension dimple, and/or by using an accelerometer for measuring the acceleration of the slider. Both the pressure sensor and the acceleration sensor are integrated with a suspension having a laminated flexure.

The signal output from the sensors includes both air-flow-related noise and write-current-related noise. Noise that is caused by air-flow typically has a very low frequency component, i.e., less than 20 kHz. Noise that is caused by write current typically has a very high frequency, i.e., greater than 2 Mhz. Accordingly, the present invention passes the frequency component at the pitch mode frequency of the slider at approximately 200 kHz, and at the first bending mode frequency of the slider body at approximately 1.7 MHz, while removing low-frequency noise caused by air flow and high-frequency noise caused by write current.

Tables 1-3 below respectively set forth simulation results of the expected acceleration of the R/W element of a slider and the expected force applied to a dimple of a suspension for soft, medium-soft and hard asperities on a disk

TABLE 1

Slider/Lubrication Interaction

| | | Remarks |
|---|---|---|
| Force: | | |
| Fz | 1.5 mN | |
| Fx | 1.5 mN | |
| Duration: | 6 μs | Assumed 0.5 μs risetime, 5.0 μs peak duration, and 0.5 μs decay. |
| Results: | | |
| FHM at R/W | 10 nm | |
| Acceleration at R/W | 8,000 m/s$^2$ | 200 kHz oscillation |
| Acceleration at dimple | 2,400 m/s$^2$ | |
| Stress (x) | 200,000 N/m/m | |
| Strain (x) | $4.00 \times 10^{-7}$ | |
| Force at the dimple | 0.6 mN | |

TABLE 2

Slider/Medium Hardness Asperity Interaction

| | | Remarks: |
|---|---|---|
| Force: | | |
| Fz | 1.5 mN | |
| Fx | 1.5 mN | |
| Duration: | 1 μs | Assumed 0.2 μs risetime, 0.6 μs peak duration, and 0.2 μs decay. |
| Results: | | |
| FHM at R/W | 5 nm | |
| Acceleration at R/W | 26,000 m/s$^2$ | 200 kHz and 1.7 MHz oscillations |
| Acceleration at dimple | 7,000 m/s$^2$ | |
| Stress (x) | 75,000 N/m/m | |
| Strain (x) | $1.9 \times 10^{-7}$ | |
| Force at the dimple | 0.5 mN | |

TABLE 3

Slider/Hard Asperity Interaction

| | | Remarks |
|---|---|---|
| Force: | | |
| Fz | 1.5 mN | |
| Fx | 1.5 mN | |
| Duration: | 0.5 μs | Assumed 0.1 μs risetime, 0.3 μs peak duration, and 0.1 μs decay. |
| Results: | | |
| FHM at R/W | 1.4 nm | |
| Acceleration at R/W | 30,000 m/s$^2$ | 1.7 MHz oscillation |
| Acceleration at dimple | 8,000 m/s$^2$ | |
| Stress (x) | 80,000 N/m/m | 1.7 MHz |
| Strain (x) | $2.0 \times 10^{-7}$ | 1.7 MHz |
| Force at the dimple | 0.22 mN | |

Simulated acceleration at the R/W element is calculated to be between 8,000 to 30,000 m/s$^2$ (or 800-3000 G). The simulated force applied to a dimple is calculated to be between 0.22 mN to 0.6 mN.

Figure 2A:
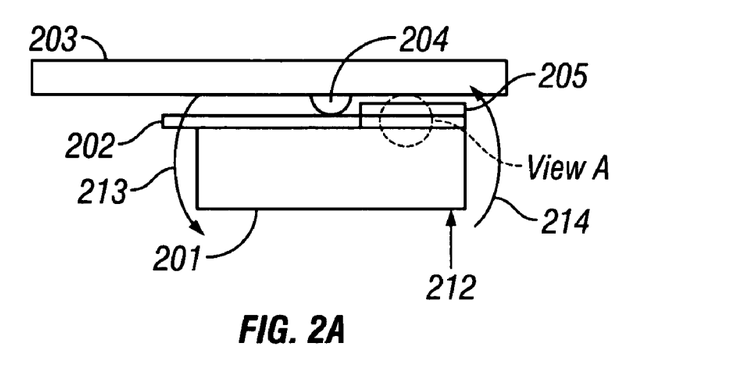
FIG. 2A shows a side view of a slider, a suspension and a flexure having a first exemplary embodiment of an integrated accelerometer according to the present invention.
Figure 2B:
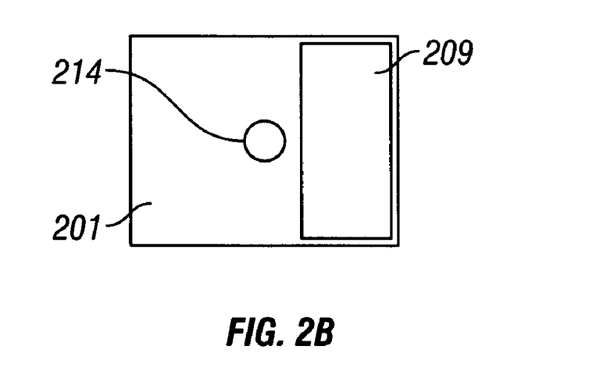
FIG. 2B shows a top view of a piezoelectric material layer of the first exemplary embodiment of the integrated accelerometer shown in FIG. 2A.

FIG. 2A shows a side view of a slider, a suspension and a flexure having a first exemplary embodiment of an integrated accelerometer according to the present invention. FIG. 2B shows a top view of a piezoelectric material layer of the first exemplary embodiment of the integrated accelerometer shown in FIG. 2A. In FIG. 2A, a slider 201 is attached to a suspension flexure 202 in a well-known manner. Flexure 202 is a laminated flexure, such as disclosed by U.S. Pat. No. 4,996,623 to Erpelding et al. or by U.S. Pat. No. 5,491,597 to Bennin et al., both of which are incorporated by reference herein. Flexure 202 contacts a suspension load beam 203 through a dimple 204, which provides a gimbal function. An accelerometer 205 is fabricated as an integral part of flexure 202.

Figure 2C:
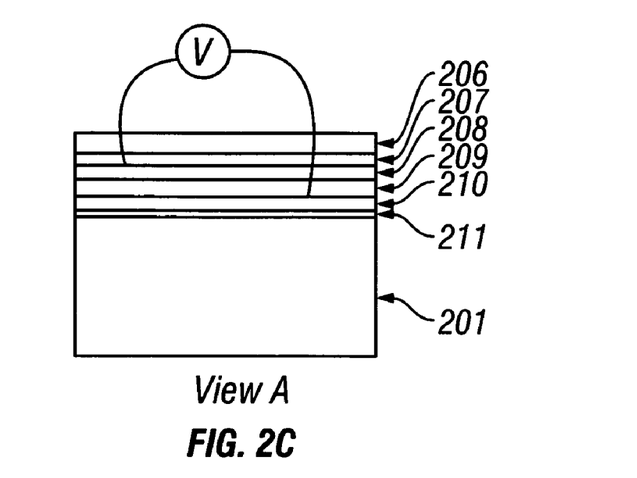
FIG. 2C shows a cross-sectional view of the first exemplary embodiment of accelerometer according to the present invention shown in FIG. 2A as view A.

FIG. 2C shows a cross-sectional view of the first exemplary embodiment of accelerometer 205 according to the present invention shown in FIG. 2A as view A. Flexure 202 includes a metal layer 206 that is formed from, for example, stainless steel. A first insulative material layer 207 is formed on metal layer 206 using well-known techniques. First insulative layer 207 is formed from, for example, polyimide. A first conductive material layer 208 is formed on first insulative layer 207 using well-known techniques and is formed from, for example, copper. A piezoelectric material layer 209, such as Poly(vinilyden fluoride) (PVDF), is formed on first conductive material layer 208 as a film using well-known techniques. A second conductive material layer 210 is formed on piezoelectric material layer 209 using well-known techniques and is formed from, for example, copper. A second insulative layer 211 is formed on second conductive layer 210 using well-known techniques and is formed from, for example, polyimide. After flexure 202 is attached to suspension load beam 203, slider 201 is glued to flexure 202 and integrated accelerometer 205.

Piezoelectric material layer 209 and the first and second conductive material layers 208 and 210 (not shown in FIG. 2B), which are formed on both sides of piezoelectric material layer 209, are patterned so that these three layers correspond to only the top of the trailing edge of slider 201 (i.e., the R/W element end of slider 201). When HDI occurs and a force 212 is applied to the trailing edge of slider 201, slider 201 typically moves in a pitch direction, as indicated by arrows 213 and 214. The resulting acceleration compresses piezoelectric material layer 209 caused by the inertia and rigidity of metal layer 206. When piezoelectric material layer 209 is compressed, a voltage difference of a few millivolts is generated across piezoelectric material layer 209, as depicted by voltage V. The voltage difference is easily detected using a well-known voltage detection technique. By monitoring the voltage generated across piezoelectric material layer 209, the acceleration imparted to slider 201 by HDI can be determined. Detection accuracy can be further improved by adding a low-pass and/or high-pass, and/or peak filter between the output of piezoelectric material layer 209 and the voltage detection device. The best center frequency for a peak filter is at the pitch frequency of the slider.

Figure 3A:
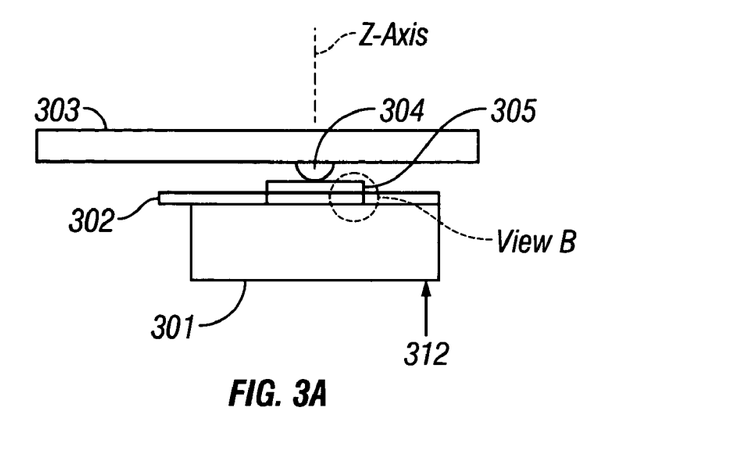
FIG. 3A shows a side view of a slider, a suspension and a flexure having an exemplary embodiment of an integrated pressure sensor for detecting dimple pressure according to the present invention.
Figure 3B:
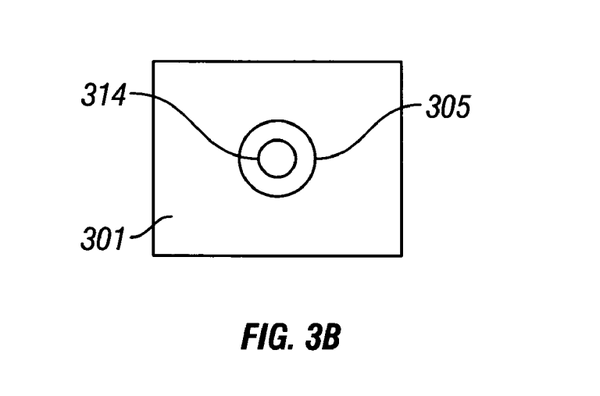
FIG. 3B shows a top view of a piezoelectric material layer of the exemplary embodiment of the integrated pressure sensor for detecting dimple pressure according to the present invention shown in FIG. 3A.

FIG. 3A shows a side view of a slider, a suspension arid a flexure having an exemplary embodiment of an integrated pressure sensor for detecting dimple pressure according to the present invention. FIG. 3B shows a top view of a piezoelectric material layer of the exemplary embodiment of the integrated pressure sensor for detecting dimple pressure according to the present invention shown in FIG. 3A. In FIG. 3A, a slider 301 is attached to a suspension flexure 302 in a well-known manner. Flexure 302 is a laminated flexure, such as disclosed by U.S. Pat. No. 4,996,623 to Erpelding et al. or by U.S. Pat. No. 5,491,597 to Bennin et al., both of which are incorporated by reference herein. Flexure 302 contacts a suspension load beam 303 through a dimple 304, which provides a gimbal function. A pressure sensor 305 is fabricated as an integral part of flexure 302.

Figure 3C:
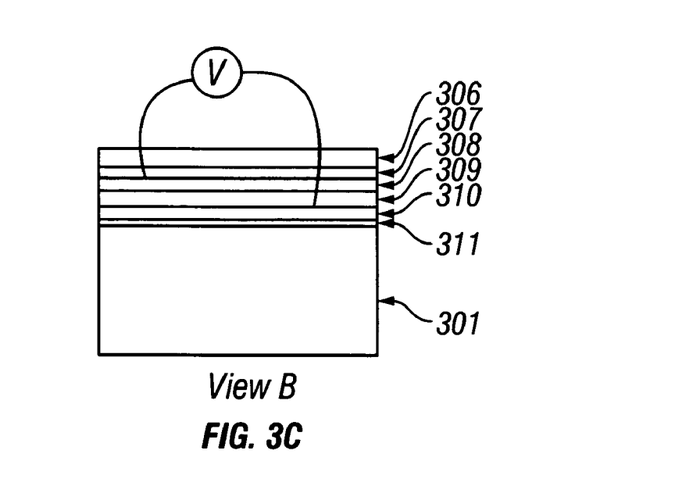
FIG. 3C shows a cross-sectional view of the first exemplary embodiment of a pressure sensor for detecting dimple pressure according to the present invention shown in FIG. 3A as view B.

FIG. 3C shows a cross-sectional view of the exemplary embodiment of a pressure sensor 305 for detecting dimple pressure according to the present invention shown in FIG. 3A as view B. Flexure 302 includes a metal layer 306 that is formed from, for example, stainless steel. A first insulative material layer 307 is formed on metal layer 306 using a well-known technique. First insulative layer 307 is formed from, for example, polyimide. A first conductive material layer 308 is formed on first insulative layer 307 using a well-known technique and is formed from, for example, copper. A piezoelectric material layer 309, such as PVDF, is formed on first conductive material layer 308 as a film using a well-known technique. A second conductive material layer 310 is formed on piezoelectric layer 309 using a well-known technique and is formed from, for example, copper. A second insulative layer 311 is formed on second conductive material layer 310 using a well-known technique and is formed from, for example, polyimide. After flexure 302 is attached to suspension load beam 303, slider 301 is glued to flexure 302 and integrated pressure sensor 305.

Piezoelectric material layer 309 and the first and second conductive material layers 308 and 310 (not shown in FIG. 3B), which are formed on both sides of piezoelectric material layer 309, are patterned so that these three layers exist around dimple contact region 314. FIG. 3B shows a substantially circularly shaped patterning, although it should be understood that alternative shapes can also be used. When HDI occurs and a force 312 is applied to the trailing edge of slider 301, slider 301 moves toward dimple 304 along the z-axis, the inertia of the suspension compresses piezoelectric material layer 309, resulting in a detectable voltage of several millivolts across piezoelectric material layer 309. Detection accuracy can be further improved by adding a low-pass and/or high-pass, and/or peak filter between the output of piezoelectric material layer 309 and the voltage detection device. The best center frequency for a peak filter is at the pitch frequency of the slider.

Figure 4A:
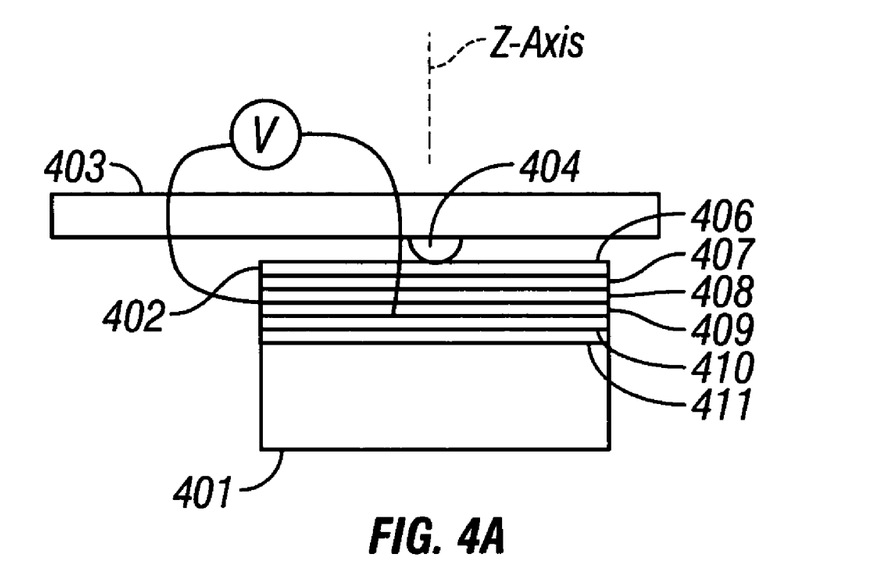
FIG. 4A shows a side view of a slider, a suspension and a flexure having a second exemplary embodiment of an integrated accelerometer for detecting vertical acceleration and first pitch mode of the slider according to the present invention.
Figure 4B:
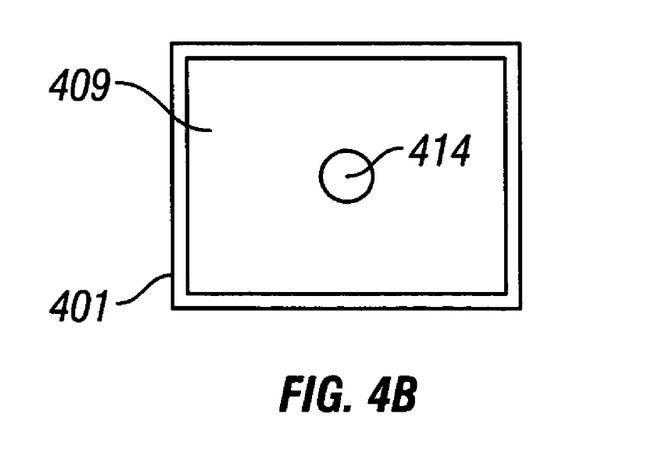
FIG. 4B shows a top view of a piezoelectric material layer of the second exemplary embodiment of the integrated accelerometer shown in FIG. 4A.

FIG. 4A shows a side view of a slider, a suspension and a flexure having a second exemplary embodiment of an integrated accelerometer for detecting vertical acceleration and the first pitch mode of the slider according to the present invention. FIG. 4B shows a top view of a piezoelectric material layer of the second exemplary embodiment of the integrated accelerometer shown in FIG. 4A. In FIG. 4A, a slider 401 is attached to a suspension flexure 402 in a well-known manner. Only the portion of flexure 402 corresponding to the integrated accelerometer is shown in FIG. 4A. Flexure 402 is a laminated flexure, such as disclosed by U.S. Pat. No. 4,996,623 to Erpelding et al. or by U.S. Pat. No. 5,491,597 to Bennin et al., both of which are incorporated by reference herein. Flexure 402 contacts a suspension load beam 403 through a dimple 404, which provides a gimbal function. An accelerometer 405 is fabricated as an integral part of flexure 402.

Flexure includes a metal layer 406 that is formed from, for example, stainless steel. A first insulative material layer 407 is formed on metal layer 406 using a well-known technique and is formed from, for example, polyimide. A first conductive material layer 408 is formed on first insulative layer 407 using a well-known technique and is formed from, for example, copper. A piezoelectric material layer 409, such as PVDF, is formed on first conductive material layer 408 as a film using a well-known technique. A second conductive material layer 410 is formed on piezoelectric layer 409 using a well-known technique and is formed from, for example, copper. A second insulative layer 411 is formed on second conductive layer 410 using a well-known technique and is formed from, for example, polyimide. After flexure 402 is attached to suspension load beam 403, slider 401 is glued to flexure 402 and integrated accelerometer 405.

Piezoelectric material layer 409 and the first and second conductive material layers 408 and 410 (not shown in FIG. 4B) formed on both sides of piezoelectric material layer 409 are patterned so that these three layers corresponding to the entire top side of slider 401 around dimple contact region 414. FIG. 4B shows the patterning of piezoelectric material layer 409. While FIG. 4B shows a substantially square shaped patterning, it should be understood that alternative shapes can also be used. Accelerometer 405 covers entire top side of slider 401 and thereby provides a substantially flat bonding surface on the top side of slider 401 for bonding slider 401 to flexure 402. Accelerometer 405 detects the translation acceleration of slider 401 in the z-axis direction and the first bending mode amplitude of slider body 401. When HDI occurs and slider 401 moves toward dimple 404, the inertia of the suspension compresses piezoelectric material layer 409, resulting in a detectable voltage of several millivolts across piezoelectric material layer 409. Detection accuracy can be further improved by adding a low-pass and/or high-pass, and/or peak filter between the output of piezoelectric material layer 409 and the voltage detection device. The best center frequency for a peak filter is at the pitch frequency of the slider.

Figure 5A:
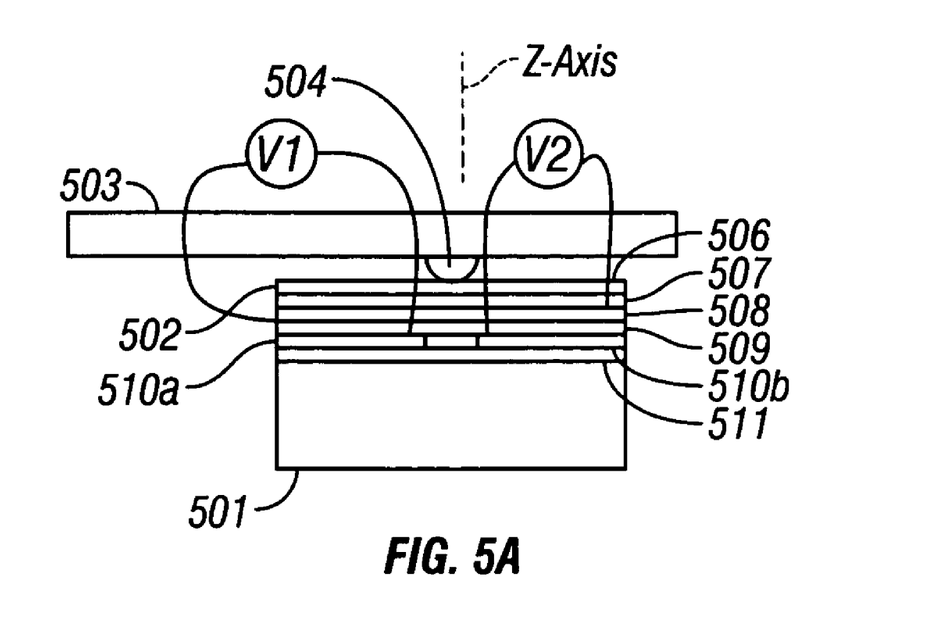
FIG. 5A shows a side view of a slider, a suspension and a flexure having a third exemplary embodiment of an integrated accelerometer for detecting pitch motion and bending motion of the slider according to the present invention.
Figure 5B:
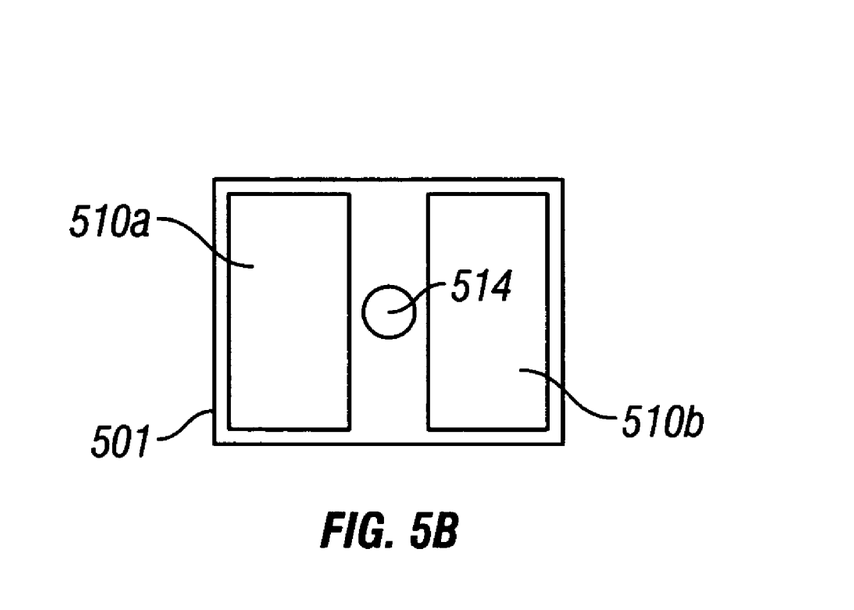
FIG. 5B shows a top view of a piezoelectric material layer of the third exemplary embodiment of the integrated accelerometer shown in FIG. 5A.

FIG. 5A shows a side view of a slider, a suspension and a flexure having a third exemplary embodiment of an integrated accelerometer for detecting pitch motion and bending motion of the slider according to the present invention. FIG. 5B shows a top view of a piezoelectric material layer of the third exemplary embodiment of the integrated accelerometer shown in FIG. 5A. In FIG. 5A, a slider 501 is attached to a suspension flexure 502 in a well-known manner. Only the portion of flexure 502 corresponding to the integrated accelerometer is shown in FIG. 5A. Flexure 502 contacts a suspension load beam 503 through a dimple 504, which provides a gimbal function. Accelerometers 505a and 505b are fabricated as an integral part of slider 501.

Flexure 502 includes a metal layer 506 that is formed from, for example, stainless steel. A first insulative material layer 507 is formed on metal layer 506 using a well-known technique. First insulative layer 507 is formed from, for example, polyimide. A first conductive layer 508 is formed on first insulative layer 507 and is formed from, for example, polyimide. Piezoelectric material layer 509 is formed on first conductive material layer 508. Piezoelectric material layer 509 is formed as a film from, for example, PVDF, using a well-known technique. Two second conductive material layers 510a and 510b are formed on piezoelectric material layer 509 using a well-known technique and are formed from, for example, copper. Second conductive material layers 510a and 510b are patterned to be separate, as shown in FIG. 5B. A second insulative layer 511 is formed on second conductive material layers 510a and 510b using a well-known technique and is formed from, for example, polyimide. After flexure 502 is attached to suspension load beam 503, slider 501 is glued to flexure 502 and integrated accelerometer 505.

The first and second conductive material layers 510a and 510b are patterned so that they respectively correspond to the front and back sides of the top side of slider 501 around dimple contact region 514, as shown in FIG. 5B. Additionally or alternatively, piezoelectric material layer 508 can be patterned as shown in FIG. 5B. Second conductive material layer 510 can also be patterned as shown in FIG. 5B. When piezoelectric material layer 508 is patterned as shown in FIG. 5B, at least one of the first conductive material layer 508 or the second conductive material layer 510 must be patterned as shown in FIG. 5B. In any alternative configuration, accelerometer 505a corresponds to the front, or leading, side of the top of slider 501 and accelerometer 505b corresponds to the back, or trailing, side of the top of slider 501, thereby providing a mostly flat bonding surface on the top side of slider 501 for bonding slider 501 to flexure 502. The pitch mode of slider 501 can be detected based on the difference of measured voltages V1 and V2, i.e., V1-V2. The first bending mode of slider body 501 can be detected based on the sum of voltages V1 and V2, i.e., V1+V2. Detection accuracy can be further improved by adding a low-pass and/or high-pass, and/or peak filter between the output of piezoelectric material layer 509 and the voltage detection device.

Figure 6:
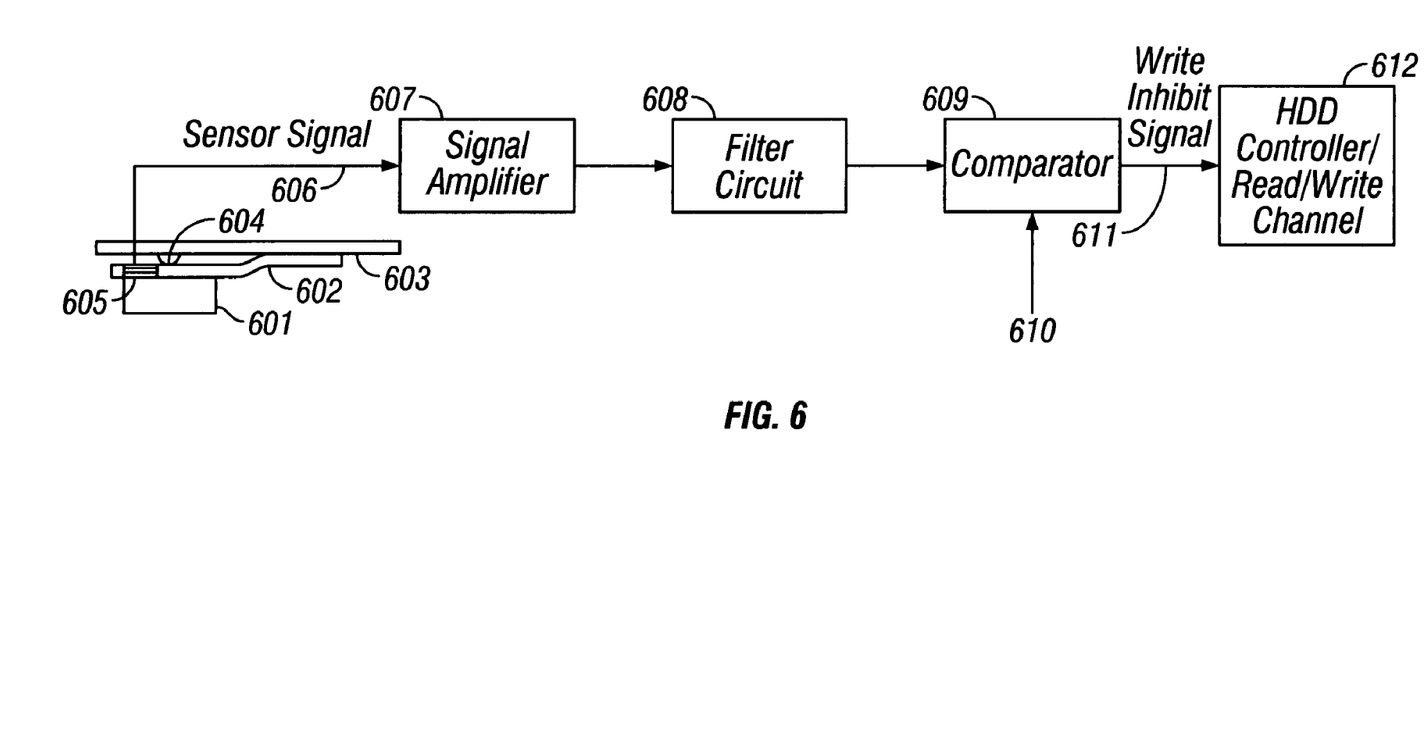
FIG. 6 shows a schematic block diagram of a circuit for detecting head-disk interaction and enabling write-inhibit followed by a data rewrite according to the present invention

FIG. 6 shows a schematic block diagram of a circuit 600 for detecting HDI according to the present invention. FIG. 6 shows a slider 601 that is attached in a well-known manner to a laminated suspension flexure 602 having an integrated accelerometer and/or pressure sensor according to the present invention. Flexure 602 contacts a suspension load beam 603, of which only a portion is shown in FIG. 6, through a dimple 604, which provides a gimbal function. An HDI sensor 605 is fabricated as an integral part of flexure 602, as described above. HDI sensor 605 can be an accelerometer and/or a pressure sensor, also as described above.

When there is a head-disk interaction event, slider 601 physically vibrates in a vertical direction. HDI sensor 605, which has been integrated with flexure 602, detects the vibration and generates a corresponding sensor signal 606. The vibration mode of slider 601 can be either a single impulse when, for example, slider 601 contacts a hard asperity, or a periodic oscillation at the pitch frequency of slider 601 when, for example, when slider 601 makes contact with the disk (not shown in FIG. 6) through an abnormally thick lubricant. Sensor signal 606 is input to a signal amplifier 607. The output of signal amplifier 607 is coupled to a filter circuit 608. Filter circuit 608 can be a high-pass filter so that low-frequency noise is rejected. The cut-off frequency the high-pass filter should preferably be set to be below the pitch-mode frequency of slider 601 so that sensor signal 606 generated in response to the slider pitch motion passes through filter circuit 608. Filter circuit 608 can also be a low-pass filter so that electrical noise generated by the write current can be rejected. Usually, the write current has frequency content that is greater than 1 MHz, whereas the slider pitch-mode frequency is a few hundred of kilohertz. Thus, it is preferred to set the cut-off frequency of low-pass filter to a frequency that is between typical write current frequency and slider pitch-mode frequency. It is even more preferable to combine both a low-pass and a high-pass filter. Alternatively, a bandpass filter can be used that only transmits a sensor signal having particular frequency. When a bandpass filter is used, it is preferred to select the pitch mode frequency of slider 601. The sequential order of signal amplifier 607 and filter circuit 608 can be reversed, that is, the signal can be first filtered and then amplified.

After the sensor signal has been conditioned by filter circuit 608, the signal amplitude is input to a comparator circuit 609. Comparator circuit 609 compares the conditioned sensor signal with a predetermined threshold value 610. When the amplitude of the conditioned sensor signal is greater than threshold value 610, comparator circuit 609 generates a write inhibit signal 611. When an HDD controller 612 (or a read/write channel that controls the write process) receives write-inhibit signal 611, HDD controller 612 immediately stops the write current that is being output to the magnetic head (not shown in FIG. 6) so that the head is the proper distance from the disk during the write process. Additionally, HDD controller 612 stops the write current so that data on an adjacent track is not mistakenly overwritten because sometimes HDI causes off-track motion of the write head. Subsequently, when write-inhibit signal is removed, controller 612 re-tries to write the same data to the same location.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A disk drive, comprising:
a base casting;
at least one disk surface coupled to the base casting;
an actuator assembly for accurately positioning at least one slider over the disk surface;
a suspension load beam having a dimple, wherein the load beam is coupled to the actuator assembly; and
a laminated flexure coupled to the suspension load beam, the flexure having a surface adapted to receive a slider and a surface adapted to contact the dimple, the flexure including a head-disk interaction sensor integral with said flexure for outputting a sensor signal when the slider contacts a disk of the disk drive wherein the head-disk interaction sensor is a pressure sensor sensing a pressure between the flexure and the dimple generated by the slider contacting the disk of the disk drive and wherein the pressure sensor includes a piezoelectric material layer and a conductive material layer, the piezoelectric material layer and the conductive material layer each being formed as a layer of the laminated flexure and each being patterned to substantially correspond to a surface region of the flexure corresponding to the dimple.

2. The disk drive according to claim 1, wherein the head-disk interaction sensor further includes an accelerometer sensing an acceleration of the flexure generated by the slider contacting the disk of the disk drive.

3. The disk drive according to claim 2, wherein the accelerometer is coupled with said piezoelectric material layer and said conductive material layer.

4. The disk drive according to claim 1, wherein the piezoelectric material layer generates a voltage between a top portion and a bottom portion of the piezoelectric material layer when the slider contacts the disk of the disk drive, the voltage generated between the top portion and the bottom portion of the piezoelectric material layer corresponding to a magnitude of a force with which the slider contacts the disk of the disk drive.

5. The disk drive according to claim 1, wherein the piezoelectric material layer and the conductive material layer are patterned to be a substantially square shape.

6. The disk drive according to claim 1, wherein the piezoelectric material layer and the conductive material layer are patterned to be a substantially circular shape.

7. The disk drive according to claim 1, wherein the piezoelectric material layer and the conductive material layer each being patterned to form a first region and a second region, the first and second regions respectively corresponding to a front portion and a back portion of the slider and respectively corresponding to first and second surface regions of the surface of the flexure adapted to contact the dimple.

8. The disk drive according to claim 7, wherein the first region of the piezoelectric material layer generates a first voltage between a top portion and a bottom portion of the first region of the piezoelectric material layer when the slider contacts the disk of the disk drive, the second region of the piezoelectric material layer generates a second voltage between a top portion and a bottom portion of the second region of the piezoelectric material layer when the slider contacts the disk of the disk drive, the first and second voltages respectively generated between the top portions and the bottom portions of the first and second regions of the piezoelectric material layer each corresponding to a magnitude of a force with which the slider contacts the disk of the disk drive, and
wherein a pitch mode of the slider is determined based on a difference between the first voltage and the second voltage.

9. The disk drive according to claim 7, wherein the first region of the piezoelectric material layer generates a first voltage between a top portion and a bottom portion of the first region of the piezoelectric material layer when the slider contacts the disk of the disk drive, the second region of the piezoelectric material layer generates a second voltage between a top portion and a bottom portion of the second region of the piezoelectric material layer when the slider contacts the disk of the disk drive, the first and second voltages respectively generated between the top portions and the bottom portions of the first and second regions of the piezoelectric material layer each corresponding to a magnitude of a force with which the slider contacts the disk of the disk drive, and
wherein a first bending mode of a body of the slider body can be determined based on a sum of the first and second voltages.

10. The disk drive according to claim 1, further comprising a write-inhibit circuit responsive to the sensor signal by inhibiting a write operation of the disk drive.

11. The disk drive according to claim 10, wherein the write-inhibit circuit includes a filter circuit conditioning the sensor signal.

12. The disk drive according to claim 11, wherein the filter circuit is a low-pass filter having a passband that is greater than about 20 kHz.

13. The disk drive according to claim 11, wherein the filter circuit is a high-pass filter having a passband that is less than about 2 MHz.

14. The disk drive according to claim 11, wherein the filter circuit is a bandpass filter having a passband between about 20 kHz and about 2 MHz.

15. The disk drive according to claim 11, wherein the filter circuit is a bandpass filter having a passband corresponding to about a pitch frequency of the slider.

16. The disk drive according to claim 11, wherein the filter circuit is a passband filter having a narrow passband at about 200 kHz.

17. The disk drive according to claim 11, wherein the filter circuit is a bandpass filter having a passband corresponding to about a bending mode frequency of a body of the slider.

18. The disk drive according to claim 11, wherein the filter circuit is a passband filter having a narrow passband at about 1.6 MHz.

19. The disk drive according to claim 11, wherein the filter circuit is a passband filter having a passband that includes about 200 kHz and about 1.6 MHz.

20. A disk drive, comprising:
a base casting;
at least one disk surface coupled to the base casting;
an actuator assembly for accurately positioning at least one slider over the disk surface;
a suspension load beam having a dimple, wherein the load beam is coupled to the actuator assembly; and
a laminated flexure coupled to the suspension load beam, the flexure having a surface adapted to receive a slider and a surface adapted to contact the dimple, the flexure including a head-disk interaction sensor integral with said flexure for outputting a sensor signal when the slider contacts a disk of the disk drive wherein the head-disk interaction sensor comprises an accelerometer sensing an acceleration of the flexure generated by the slider contacting the disk of the disk drive and wherein the accelerometer includes a piezoelectric material layer and a conductive material layer, the piezoelectric material layer and the conductive material layer each being formed as a layer of the laminated flexure and each being patterned to substantially correspond to a top surface of a back portion of the slider.

21. A disk drive, comprising:
a base casting;
at least one disk surface coupled to the base casting;
an actuator assembly for accurately positioning at least one slider over the disk surface;
a suspension load beam having a dimple, wherein the load beam is coupled to the actuator assembly; and
a laminated flexure coupled to the suspension load beam, the flexure having a surface adapted to receive a slider and a surface adapted to contact the dimple, the flexure including a head-disk interaction sensor integral with said flexure for outputting a sensor signal when the slider contacts a disk of the disk drive wherein the head-disk interaction sensor is an accelerometer sensing an acceleration of the flexure generated by the slider contacting the disk of the disk drive and wherein the accelerometer includes a piezoelectric material layer and a conductive material layer, the piezoelectric material layer and the conductive material layer each being formed as a layer of the laminated flexure and each being patterned to substantially correspond to a top surface of a back portion of the slider or wherein the head-disk interaction sensor is a pressure sensor sensing a pressure between the flexure and the dimple generated by the slider contacting the disk of the disk drive and wherein the pressure sensor includes a piezoelectric material layer and a conductive material layer, the piezoelectric material layer and the conductive material layer each being formed as a layer of the laminated flexure and each being patterned to substantially correspond to a surface region of the flexure corresponding to the dimple.

* * * * *